United States Patent
Li et al.

(10) Patent No.: US 11,452,152 B2
(45) Date of Patent: Sep. 20, 2022

(54) RADIO RESOURCE CONTROL FOR D2D COMMUNICATION

(71) Applicant: Microsoft Technology Licensing, LLC, Redmond, WA (US)

(72) Inventors: Haitao Li, Beijing (CN); Yuantao Zhang, Beijing (CN)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 837 days.

(21) Appl. No.: 14/502,631

(22) Filed: Sep. 30, 2014

(65) Prior Publication Data
US 2016/0037488 A1   Feb. 4, 2016

(30) Foreign Application Priority Data

Jul. 31, 2014   (CN) .......................... 201410370928.9

(51) Int. Cl.
*H04W 72/04* (2009.01)
*H04W 76/14* (2018.01)

(52) U.S. Cl.
CPC ......... *H04W 76/14* (2018.02); *H04W 72/048* (2013.01); *H04W 72/0406* (2013.01)

(58) Field of Classification Search
CPC .. H04W 72/04; H04W 72/004; H04W 76/023
See application file for complete search history.

(56) References Cited

U.S. PATENT DOCUMENTS

| | | | |
|---|---|---|---|
| 2010/0135360 A1* | 6/2010 | Kwak | H04L 5/0016 375/135 |
| 2013/0324114 A1 | 12/2013 | Raghothaman et al. | |
| 2014/0003262 A1 | 1/2014 | He et al. | |
| 2014/0094183 A1 | 4/2014 | Gao et al. | |

(Continued)

FOREIGN PATENT DOCUMENTS

| | | | | |
|---|---|---|---|---|
| CN | 102972058 A | 3/2013 | | |
| CN | WO 2014032222 A1 * | 3/2014 | ......... | H04W 72/082 |

(Continued)

OTHER PUBLICATIONS

Yang, et al., "Solving the Data Overload: Device-to-Device Bearer Control Architecture for Cellular Data Offloading", In IEEE Vehicular Technology Magazine, vol. 8, Issue 1, Mar. 2013, pp. 31-39.

(Continued)

*Primary Examiner* — Noel R Beharry
*Assistant Examiner* — Pamit Kaur
(74) *Attorney, Agent, or Firm* — Ray Quinney & Nebeker P.C; James Bullough

(57) ABSTRACT

This disclosure generally relates to radio resource control for D2D communication. In one embodiment, a master UE of the D2D communication may obtain radio resource information of a slave UE before performing radio resource configuration for the D2D communication between the master UE and the slave UE. Based on the radio resource information, the master UE may configure radio resource for the D2D communication. In this way, radio resource configuration may be performed for both the D2D communication and cellular communication without violating the slave UE's radio capability.

19 Claims, 5 Drawing Sheets

(56) References Cited

U.S. PATENT DOCUMENTS

2014/0162633 A1    6/2014   Hwang et al.
2014/0187283 A1*  7/2014   Nimbalker .......... H04W 72/048
                                                                       455/550.1
2016/0295623 A1* 10/2016  Kazmi ................ H04W 76/023

FOREIGN PATENT DOCUMENTS

| GB | 2497604 A | 6/2013 |
|---|---|---|
| WO | 2013048296 A1 | 4/2013 |
| WO | 2014014327 A1 | 1/2014 |
| WO | 2014032222 A1 | 3/2014 |
| WO | 2014076551 A1 | 5/2014 |

OTHER PUBLICATIONS

Asadi, et al., "WiFi Direct and LTE D2D in Action", In Proceedings of 6th Wireless Days Conference, Nov. 13, 2013, 8 pages.
Hong, et al., "Analysis of Device-to-Device Discovery and Link Setup in LTE Networks", In IEEE 24th International Symposium on Personal Indoor and Mobile Radio Communications, Sep. 8, 2013, 5 pages.
"International Search Report & Written Opinion for PCT Patent Application No. PCT/US2015/042364", dated Oct. 27, 2015, Filed Date: Jul. 28, 2015, 10 Pages.
"Office Action Issued in Chinese Patent Application No. 201580040414. X", dated Sep. 10, 2019, 11 Pages. (W/O English Translation).

* cited by examiner

RADIO RESOURCE CONTROL FOR D2D COMMUNICATION

RELATED APPLICATIONS

This application claims priority to Chinese Application No. 201410370928.9, filed on Jul. 31, 2014, and entitled "RADIO RESOURCE CONTROL FOR D2D COMMUNICATION." This application claims the benefit of the above-identified application, and the disclosure of the above-identified application is hereby incorporated by reference in its entirety as if set forth herein in full.

BACKGROUND

Major effort has been put in recent years on the development of Third Generation Partnership Project (3GPP) Long Term Evolution (LTE), which provides Evolved Universal Mobile Telecommunications System (UMTS) terrestrial radio access (EUTRA) and EUTRA network (EUTRAN) technology for higher data rates and system capacity. In 3GPP LTE-Advanced (LTE-A) cellular systems, device-to-device (D2D) communication has been proposed to enable the proximity-based service.

Compared to legacy cellular communication, the D2D communication enables direct link communication between devices and has the potential benefits of user equipment (UE) power saving, efficient radio resource reuse, offloading network's burden, and so forth.

Among D2D communication models, it is important for Evolved Universal Terrestrial Radio Access (E-UTRA) to control operations or operating roles of individual UEs involved in autonomous D2D communication, improve security and allocate resource as well as control QoS, and the like. For network controlled/assisted D2D communication, the more self-configurable or self-controllable UE is in the D2D communication, the less frequent control or assistance is needed from the network.

SUMMARY

In current 3GPP LTE-A systems, integrating the D2D communication feature into cellular system reuses existing LTE techniques and benefits mobile operators, but it also introduces coexistence issues, such as control overhead and complexity, between the D2D communication and the cellular communication. In this regard, having some C-plane functionality over D2D connection is beneficial for network controlled/assisted D2D communication. This kind of RRC model can benefit flexible radio resource control between UEs and also can be applicable to the scenario where network coverage is not available or partially available for the two UEs.

According to the RRC model, for controlling D2D communication between the two UEs, one UE may serve as a master node (also referred to as a master UE) and the other UE as a slave node (also referred to as a slave UE) in a way that the master UE is responsible for managing radio resource control towards the slave UE via D2D RRC function. This enables flexible and even autonomous D2D radio resource management on the direct link of the D2D communication. Meanwhile, the UEs involved in the D2D communication become more irrelevant to the cellular connection to the base station.

However, if UEs are involved in both D2D communication and cellular communication, e.g. in the case of parallel cellular call and local video game, this kind of RRC control would be risky of violating UEs' radio capability. For example, suppose that from the perspective of the slave UE, the antenna is shared between the two communications for lower cost. Given certain radio capability on Multiple Input Multiple Output (MIMO) layers (e.g. maximum 8 layers are supported), if the slave UE has been configured with 6 MIMO layers for the cellular communication, then in order not to violate the slave UE's radio capability, it may be at most configured with the remaining 2 MIMO layers for the D2D communication. However, without any coordination, it is likely that 4 or even higher MIMO layers are configured for the D2D communication, which is beyond the slave UE's radio capability. Apart from such MIMO capability, other radio capabilities, e.g. Maximum number of Downlink Share Channel (DL-SCH) transport block bits received within a Transmission Time Interval (TTI), Maximum number of Uplink Share Channel (UL-SCH) transport block bits transmitted within a TTI, Total number of DL-SCH soft channel bits, or supported band combination, and so forth, may have similar issues.

In order to avoid any potential performance degradation of the D2D or cellular communication, embodiments of the subject matter described herein provide a solution for radio resource control for the UEs involved in both D2D communication and cellular communication. More specifically, radio resource information of a slave UE in the cellular communication may be used for configuring radio resource for the D2D communication. In accordance with embodiments of the subject matter described herein, a master UE may obtain the radio resource information of a slave UE before performing radio resource configuration for the D2D communication. By obtaining the radio resource information, the master UE may configure radio resource for the D2D communication without exceeding the slave UE's radio capability. In this way, radio resource configuration may be performed for both the D2D communication and the cellular communication without violating the salve UE's radio capability. Accordingly, performance degradation of the D2D communication or the cellular communication can be avoided. Additionally, the proposed radio resource control will not introduce any resource waste in the cellular system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

As used herein, the term "base station" (BS) may represent a node B (NodeB or NB), an evolved NodeB (eNodeB or eNB), a Remote Radio Unit (RRU), a radio header (RH), a remote radio head (RRH), a relay, a low power node such as a femto, a pico, and so forth.

As used herein, the term "user equipment" (UE) refers to any device that is capable of communicating with the BS. By way of example, the UE may include a terminal, a Mobile Terminal (MT), a Subscriber Station (SS), a Portable Subscriber Station (PSS), a Mobile Station (MS), or an Access Terminal (AT).

As used herein, the term "includes" and its variants are to be read as open terms that mean "includes, but is not limited to." The term "or" is to be read as "and/or" unless the context clearly indicates otherwise. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
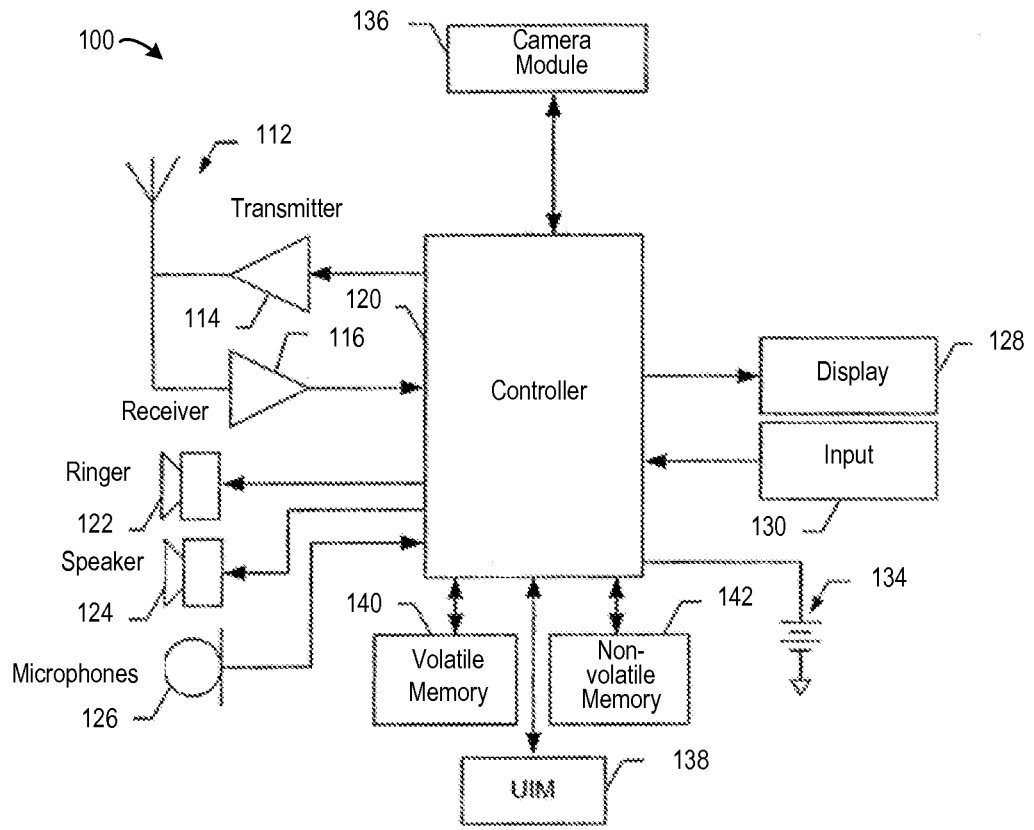
FIG. 1 illustrates a block diagram of a UE in accordance with one embodiment of the subject matter described herein.

FIG. 1 illustrates a block diagram of a UE 100 in accordance with one embodiment of the subject matter described herein. The UE 100 may be a mobile device with a wireless communication capability. However, it is to be understood that any other types of user devices may also easily adopt embodiments of the subject matter described herein, such as a portable digital assistant (PDA), a pager, a mobile computer, a mobile TV, a game apparatus, a laptop, a tablet computer, a camera, a video camera, a GPS device, and other types of voice and textual communication system. A fixed-type device may likewise easily use embodiments of the subject matter described herein. As shown, the UE 100 comprises one or more antennas 112 operable to communicate with the transmitter 114 and the receiver 116. The UE 100 further comprises at least one controller 120. With these devices, the UE 100 may perform cellular communications with one or more BSs. Additionally, the UE 100 may support the D2D communications with one or more other UEs.

The UE 100 further comprises at least one controller 120. It should be understood that the controller 120 comprises circuits or logic required to implement the functions of the user terminal 100. For example, the controller 120 may comprise a digital signal processor, a microprocessor, an A/D converter, a D/A converter, and/or any other suitable circuits. The control and signal processing functions of the UE 100 are allocated in accordance with respective capabilities of these devices.

The UE 100 may further comprise a user interface, which, for example, may comprise a ringer 122, a speaker 124, a microphone 126, a display 128, and an input interface 130, and all of the above devices are coupled to the controller 120. The UE 100 may further comprise a camera module 136 for capturing static and/or dynamic images.

The UE 100 may further comprise a battery 134, such as a vibrating battery set, for supplying power to various circuits required for operating the user terminal 100 and alternatively providing mechanical vibration as detectable output. In one embodiment, the UE 100 may further comprise a user identification module (UIM) 138. The UIM 138 is usually a memory device with a processor built in. The UIM 138 may for example comprise a subscriber identification module (SIM), a universal integrated circuit card (UICC), a universal user identification module (USIM), or a removable user identification module (R-UIM), etc. The UIM 138 may comprise a card connection detecting apparatus according to embodiments of the subject matter described herein.

The UE 100 further comprises a memory. For example, the user terminal 100 may comprise a volatile memory 140, for example, comprising a volatile random access memory (RAM) in a cache area for temporarily storing data. The UE 100 may further comprise other non-volatile memory 142 which may be embedded and/or movable. The non-volatile memory 142 may additionally or alternatively include for example, EEPROM and flash memory, etc. The memory may store any item in the plurality of information segments and data used by the UE 100 so as to implement the functions of the UE 100.

It should be understood that the structural block diagram in FIG. 1 is shown only for illustration purpose, without suggesting any limitations on the scope of the subject matter described herein. In some cases, some devices may be added or reduced as required.

Figure 2:
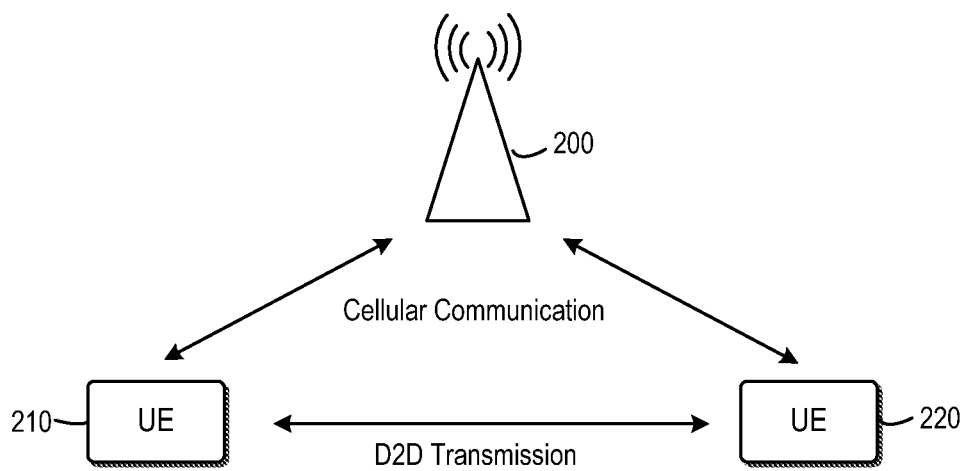
FIG. 2 illustrates a block diagram of an environment in which embodiments of the subject matter described herein may be implemented.

FIG. 2 shows an environment of a cellular system in which embodiments of the subject matter described herein may be implemented. As shown, one or more UEs may communicate with a BS 200. In this example, there are two UEs 210 and 220. This is only for the purpose of illustration without suggesting limitations on the number of UEs. There may be any suitable number of UEs in cellular communication with the BS 200. In one embodiment, the UEs 210 and/or 220 may be implemented by the UE 100 as shown in FIG. 1, for example.

The cellular communications between the UEs 210 and 220 and the BS 200 may be performed according to any appropriate communication protocols including, but not limited to, the first generation (1G), the second generation (2G), 2.5G, 2.75G, the third generation (3G), the fourth generation (4G) communication protocols, and/or any other protocols either currently known or to be developed in the future.

Two or more UEs may perform D2D communications with each other. In the shown example, only for the purpose of illustration, the UE 210 serves as a master UE while the UE 220 serves as a slave UE. The UE 210 is responsible for managing radio resource control towards UE 220 via D2D RRC function. As can be appreciated by those skilled in the art, in other embodiments, the UE 220 may serve as a master UE and the UE 210 may serve as a slave UE. Two UEs involved in the D2D communication may be referred to as a pair of UEs of the D2D communication. From the perspective of a UE (for example, the UE 210) of the D2D communication, the UE 220 may be considered as its paired UE. Likewise, from the perspective of the UE 220, the UE 210 may be considered as its paired UE.

In autonomous D2D communication, if a D2D connection is to be set up between the UE 210 and the UE 220, the UE 210 may configure radio resource to the UE 220 to perform the D2D communication. Due to lack of knowledge of the cellular radio resource configuration, there would be a risk of violating UE's radio capability.

Figure 3:
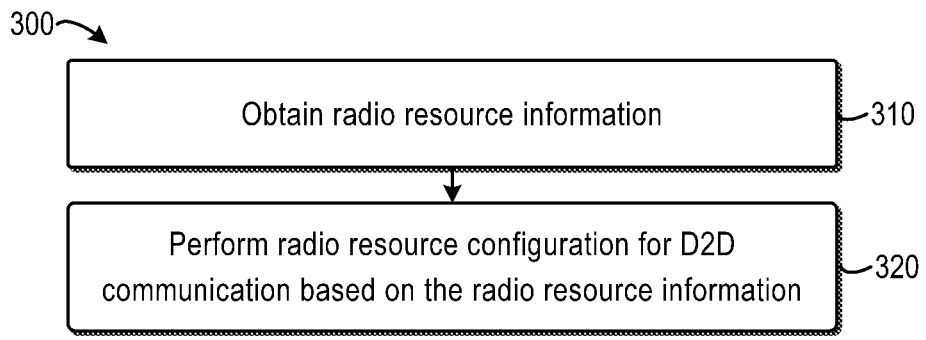
FIG. 3 illustrates a flowchart of a method for radio resource controlling at the master UE side in accordance with one embodiment of the subject matter described herein.

FIG. 3 shows the flowchart of a method 300 for radio resource controlling at the master UE side in accordance with one embodiment of the subject matter described herein.

The method 300 is entered at step 310, where radio resource information of a slave UE in cellular communication is obtained, for example, by use of one or more receivers 116 of the master UE 210. By way of example, in one embodiment, the radio resource information may include cellular radio resource configuration information of the slave UE, for example, the UE 220. Alternatively or additionally, the radio resource information may further include radio capability information of the UE 220, wherein the radio capability information indicates the maximum radio resource capability of the UE 220. Of course, it is also possible to receive any additional or alternative information at step 310.

By way of example, in one embodiment, the transmitter 114 of the UE 210 may be configured to transmit to the BS 200 a message indicating that the D2D communication is to be set up, and the receiver 116 of the UE 210 may be configured to receive the radio resource information, which is transmitted from the BS 200 in response to the message. In the embodiment, the radio resource information may include cellular radio resource configuration information and radio capability information of the UE 220. The radio capability information may indicate the maximum radio resource capability of a UE. According to embodiments of the subject matter described herein, the radio capability information may include MIMO capability, maximum number of DL-SCH transport block bits received within a TTI, maximum number of UL-SCH transport block bits transmitted within a TTI, total number of DL-SCH soft channel bits, supported band combination, and the like.

Alternatively, in one embodiment, in response to that cellular radio resource of the UE 220 is configured after the D2D communication is set up, the BS 200 or the UE 220 may transmit the radio resource information to the UE 210. Thus, the receiver 116 of the UE 210 may be configured to receive the radio resource information from the BS 200 or the UE 220. In the embodiment, the radio resource information may include cellular radio resource configuration information of the UE 220. Since the UE 210 may have the radio capability information of the UE 220 when setting up the D2D communication, the radio resource information may not include the radio capability information. As an alternative, the radio resource information may include both cellular radio resource configuration information and radio capability information of the UE 220.

On the basis of the radio resource information, at step 320, the controller 120 of the UE 210 is configured to perform radio resource configuration for the D2D communication. In this way, the UE 210 may take the cellular radio resource configuration information of the UE 220 into account when configuring radio resource for the D2D communication, without exceeding the UE 220's radio capability.

As discussed above, in autonomous D2D communication, when a D2D communication is to be set up between the UE 210 and the UE 220, the UE 210, serving as a master UE, may configure D2D radio resource of the UE 220. Due to lack of knowledge of the cellular radio resource configuration, there would be a risk of violating UE's radio capability. Contrary to such conventional solution, in accordance with embodiments of the subject matter described herein, the radio resource information about radio resource configuration of cellular communication is used for radio resource configuration of the D2D communication. In this way, it is possible to enable the D2D communication with higher success rate, and thus performance degradation of the D2D communication can be avoided.

In one embodiment, after the D2D communication is set up, the D2D radio resource may be configured, for example, by use of the UE 210. Responsive to D2D radio resource being configured, the transmitter 114 of the UE 210 may be configured to transmit D2D radio resource configuration information to the BS 200. As can be appreciated by those skilled in the art, configuring the D2D radio resource not only comprises initial configuration but also reconfiguration of the D2D radio resource. With the D2D radio resource configuration information, the BS 200 may update related records. In this way, it is possible to ensure future cellular radio resource configurations will not exceed UE's radio capability.

Figure 4:
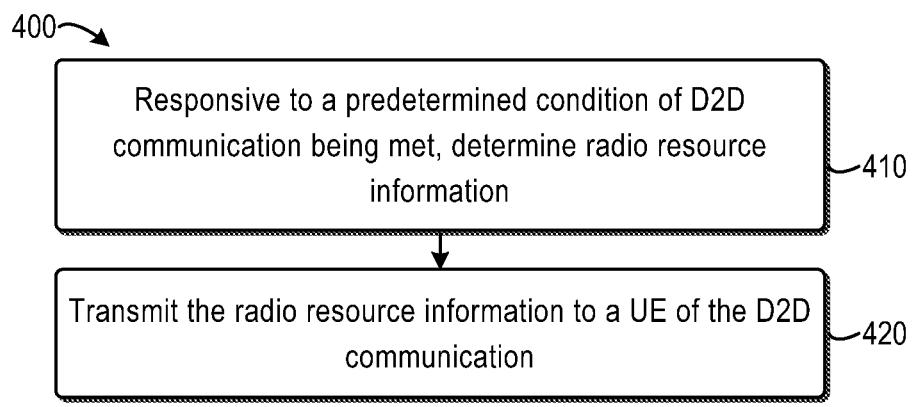
FIG. 4 illustrates a flowchart of a method for radio resource controlling at the BS side in accordance with one embodiment of the subject matter described herein.

FIG. 4 illustrates a flowchart of a method for radio resource controlling at the BS side in accordance with one embodiment of the subject matter described herein.

The method 400 is entered at step 410 where radio resource information of a slave UE in cellular communication is determined, for example, by the BS 200, in response to a predetermined condition of D2D communication between a master UE and the slave UE being met.

For example, in one embodiment, the predetermined condition may be receiving a message indicating that the D2D communication is to be set up. In response to the message, the BS 200 may obtain the cellular radio resource configuration information and radio capability information of the slave UE, for example, UE 220 and include them in the radio resource information.

Alternatively or additionally, in on embodiment, the predetermined condition may be configuring cellular radio resource of the UE 220 after the D2D communication is set up. As can be appreciated by those skilled in the art, configuring the cellular radio resource not only comprises initial configuration but also reconfiguration of the cellular radio resource. In response to the configuration of the UE 220 after the D2D communication is set up, the BS 200 may obtain the radio resource information, which may include cellular radio resource configuration information of the UE 220. Since the master UE, for example, the UE 210, may have the radio capability information of the UE 220 when setting up the D2D communication, the radio resource information may not include the radio capability information. As an alternative, the radio resource information may include both cellular radio resource configuration information and radio capability information of the UE 220.

According to embodiments of the subject matter described herein, there may be other predetermined conditions. The aforesaid predetermined conditions are merely for the purpose of illustration, without suggesting any limitations on the subject matter described herein.

Next, at step 420, the BS 200 transmits the radio resource information to the UE 210. In this way, the UE 210 may take the cellular radio resource configuration information of the UE 220 into account when configuring radio resource for the D2D communication, without exceeding the UE 220's radio capability.

In one embodiment, after the D2D communication is set up, the D2D radio resource may be configured, for example, by use of the UE 210. Responsive to the configuration, D2D radio resource configuration information may be transmitted from the UE 210 to the BS 200. As can be appreciated by those skilled in the art, configuring the D2D radio resource not only comprises initial configuration but also reconfiguration of the D2D radio resource. The BS 200 may receive the D2D radio resource configuration information from the UE 210, so as to update related records. In this way, it is possible to ensure future cellular radio resource configurations will not exceed UE's radio capability.

Embodiments of the subject matter described herein are not limited to the case where paired UEs, e.g., the UE 210 and the UE 220, are served by the same BS. It is also applicable to the case where the paired UEs are served by different BSs. In one embodiment, if the UE 210's serving BS is different from the UE 220's serving BS, the radio resource information determined at step 410 may be obtained by the UE 210's serving BS from the UE 220's serving BS via an interface therebetween. The interface may be, for example, an X2 interface, and thus the radio resource information may be obtained by the UE 210's serving BS by using X2 interface signaling.

Figure 5:
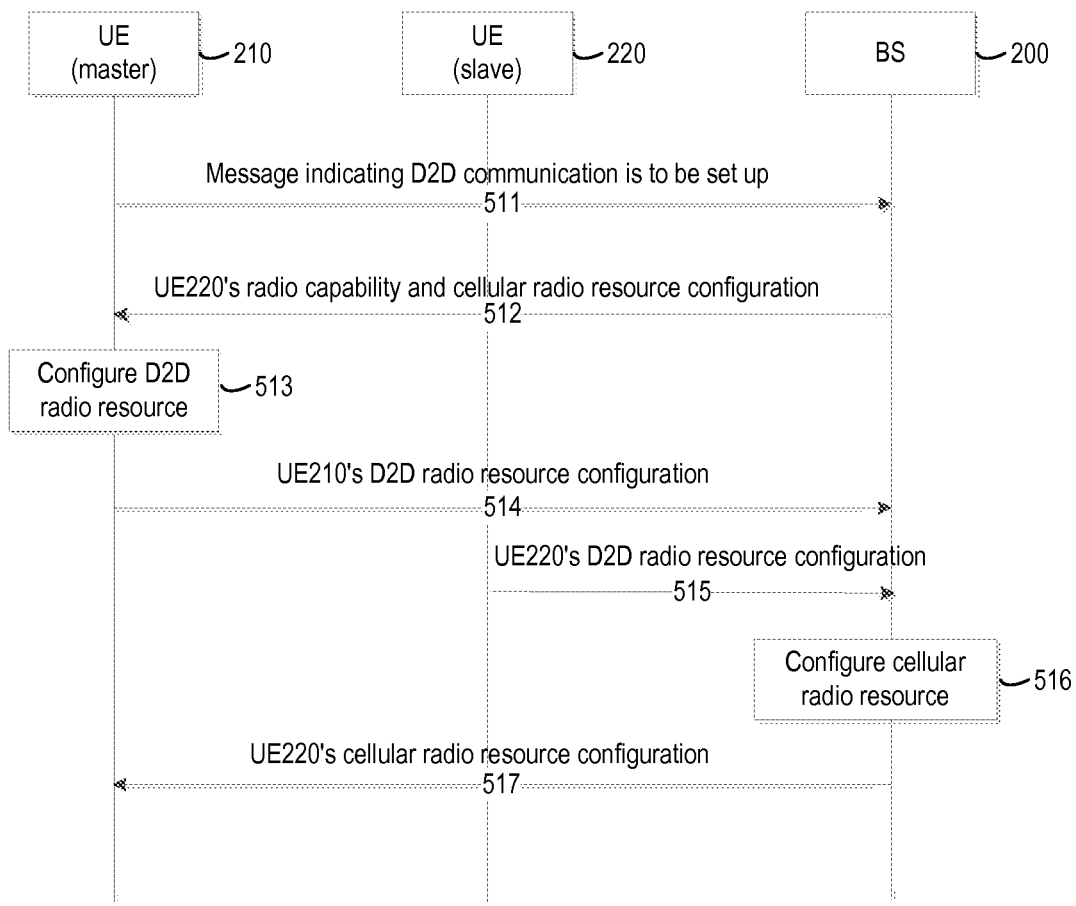
FIG. 5 illustrates a diagram of signaling flows for radio resource controlling in accordance with one embodiment of the subject matter described herein.

For the purpose of illustration, FIG. 5 shows a diagram of signaling flows for radio resource controlling in accordance with one embodiment of the subject matter described herein. As shown, the BS 200 serves both the UE 210 and the UE 220 in the cellular communication, and the UE 210 and the UE 220 may perform D2D communication with each other.

As discussed above, when setting up the D2D connection between the master UE 210 and the slave UE 220, the UE 210 may transmit (511) to the BS 200 a message indicating D2D communication is to be set up. In response to the message, the BS 200 may provide (512) the UE 210 the UE 220's radio capability information together with the UE 220's existing cellular radio resource configuration. Based on this, the UE 210 may judge how much UE capability is left for future D2D radio resource configuration.

After D2D radio resource between the UE 210 and the UE 220 is configured (513), both the UE 210 and the UE 220 may transmit (514, 515) their D2D radio resource configuration to the BS 200, respectively. In this way, the BS 200 may be informed of the updated D2D configuration, so that it may ensure future cellular radio resource configuration will not exceed UE's radio capability.

When the BS 200 successfully configure (516) cellular radio resource to a UE (e.g., the UE 220), the BS 200 may signal (517) the cellular radio resource configuration of the UE 220 to the master UE 210 so that the UE 210 is aware of the newest cellular radio resource configurations of the UE 220. Alternatively, the slave UE's cellular radio resource configuration may be directly signaled to the master UE over air interface between the two UEs. For example, the UE 220 may send its cellular radio resource configuration to the UE 210 via D2D communication's control plane signaling. This may help the master UE 210 to ensure future D2D radio resource configurations will not exceed the slave UE 220's radio capability.

Figure 6:
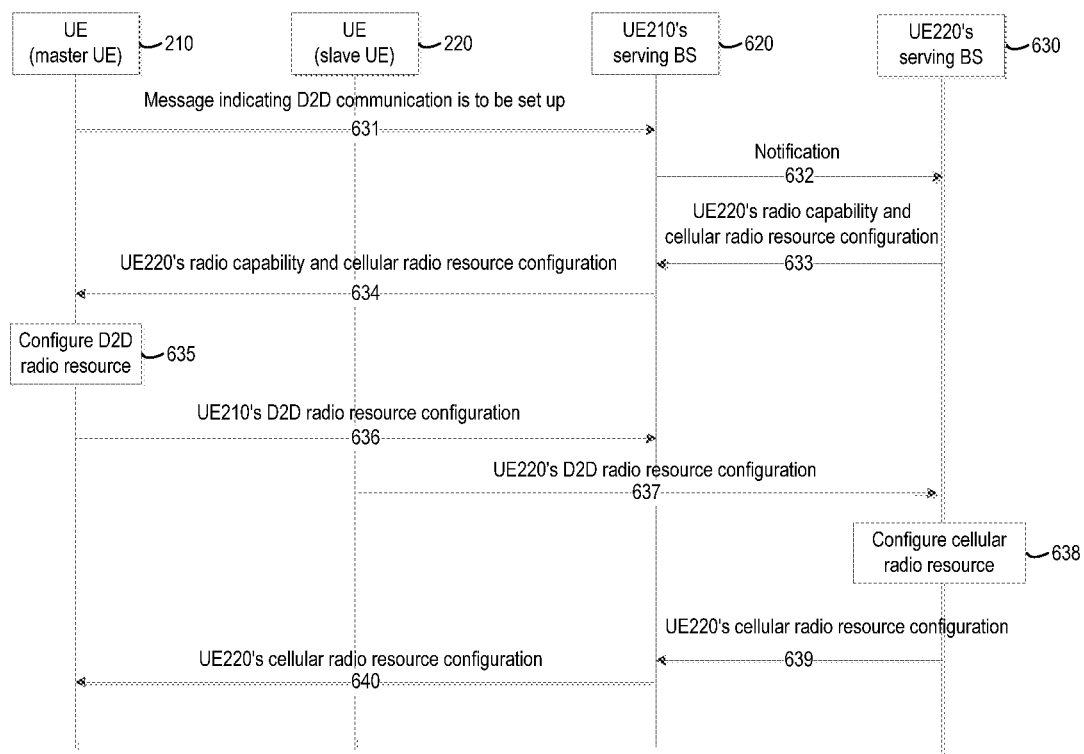
FIG. 6 illustrates a diagram of signaling flows for radio resource controlling in accordance with one embodiment of the subject matter described herein.

As discussed above, embodiments of the subject matter described herein are not limited to the case where the two UEs, e.g., the UE 210 and the UE 220, are served by the same BS. It is also applicable to the case where the paired UEs are served by different BSs. In this respect, FIG. 6 illustrates a diagram of signaling flows for radio resource controlling in accordance with one embodiment of the subject matter described herein.

In current LTE system, UE's radio capability is stored in Mobility Management Entity (MME) side and the MME will signal it to the UE's serving BS so that the serving BS may perform radio resource configuration based thereon. To facilitate D2D radio resource configuration between UEs, it is also necessary for the master UE to be aware of the radio capability of the slave UE. This may be done by enhancing the air interface's functionalities. For example, in the case that the two UEs of the D2D communication are served by the same BS, when the BS detect, e.g. based on some UE report or indication, that D2D communication will be established between the UEs, the BS may signal one UE's radio capability to its paired UE. If these two UEs are served by two different BSs, for example, the UE 210 is served by the BS 620 and the UE 220 is served by the BS 630, then an interface, such as X2 interface, may be used to forward the UE's radio capability between the BSs. In this way, in response to that the UE 210 transmits (631) to the BS 620 a message indicating D2D communication is to be set up, the BS 620 may send (632) a notification to the UE 220's serving BS 630 to indicate the establishment of the D2D communication. The BS 630 may transmit (633), to the BS 620, UE 220's radio capability information as well as its existing cellular radio resource configuration to the UE 210, for example, by using X2 interface signaling. Then, the BS 620 may provides (634) the master UE 210 the slave UE 220's radio capability information together with the UE 220's existing cellular radio resource configuration. Transfer of both UE's radio capability and cellular radio resource configuration may help the UE (e.g. the UE 210) to judge how much UE's radio capability is left for initial D2D radio resource configuration.

Besides this initial D2D configuration case, the UEs may be also responsible for updating successful D2D radio resource configurations to the networks over air interface. As shown in FIG. 6, after D2D radio resource between the UE 210 and the UE 220 is configured (635), both the UE 210 and the UE 220 may transmit (636, 637) their D2D radio resource configuration to their respective BSs 620 and 630. In this way, the BSs are enabled to perform cellular radio resource configuration correctly without violating UE's radio capability.

To ensure UE's radio capability is not violated in subsequent cellular and D2D radio resource control procedures, it also requires that the serving BSs 620 and 630 be kept aware of the existing cellular and D2D radio resources. To achieve this goal, interface between the BSs may be enhanced to update the D2D and cellular radio resource configurations. That is, the BSs 620 and 630 may update successful cellular radio resource configurations to the UEs over interface (for example, X2 interface) to help future D2D radio resource configurations not to violate UE's radio capability. As shown in FIG. 6, when the BS 630 successfully configure (638) cellular radio resource to the UE 220, the BS 630 may signal (639) the cellular radio resource configuration of the UE 220 to the BS 620, e.g., via the X2 interface. Then the BS 620 may signal (640) it to the UE 210, so that the UE 210 is aware of the newest cellular radio resource configurations of the UE 220. As an alternative, UE's cellular radio resource configurations may be directly updated between the UEs via D2D communication's control plane signaling.

It is to be noted that, for simplicity, the signaling flow is shown based on master-slave control pattern, in which case the master UE acquires the slave UE's radio capability and cellular radio resource configuration. Without loss of generality, if the two UEs configure each other, either of the two UEs may be a master UE.

Figure 7:
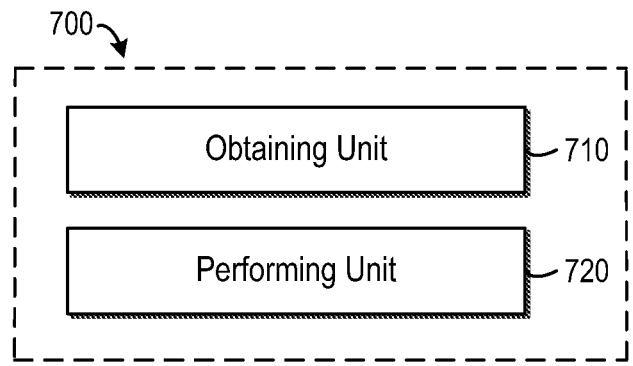
FIG. 7 illustrates a block diagram of an apparatus for radio resource controlling at the master UE side in accordance with one embodiment of the subject matter described herein.

FIG. 7 illustrates a block diagram of an apparatus 700 for radio resource controlling at the master UE side in accordance with one embodiment of the subject matter described herein. As shown, the apparatus 700 comprises an obtaining unit 710 configured to obtain radio resource information a slave UE in cellular communication. The apparatus 700 further comprises a performing unit 720 configured to perform D2D communication between the master UE and the slave UE based on the radio resource information.

In one embodiment, the obtaining unit 710 may comprise a transmitting unit configured to transmit a message indicating that the D2D communication is to be set up to a base station associated with the cellular communication, and a receiving unit configured to receive the radio resource information from the base station, wherein the radio resource information is transmitted from the base station in response to the message. In one embodiment, the radio resource information may include cellular radio resource configuration information and radio capability information of the slave UE.

In one embodiment, the radio capability information may include at least one of: MIMO capability, maximum number of DL-SCH transport block bits received within a TTI, maximum number of UL-SCH transport block bits transmitted within a TTI, total number of DL-SCH soft channel bits, and supported band combination.

In one embodiment, the obtaining unit 710 may comprise a receiving unit configured to receive the radio resource information from a base station associated with the cellular communication or from the slave UE, wherein the radio resource information is transmitted from the base station or the slave UE in response to that cellular radio resource of the slave UE is configured after the D2D communication is set up. In one embodiment, the radio resource information may include cellular radio resource configuration information of the slave UE.

In one embodiment, the apparatus 700 may further comprise a transmitting unit configured to, responsive to D2D radio resource being configured after the D2D communication is set up, transmit D2D radio resource configuration information to a base station associated with the cellular communication.

Figure 8:
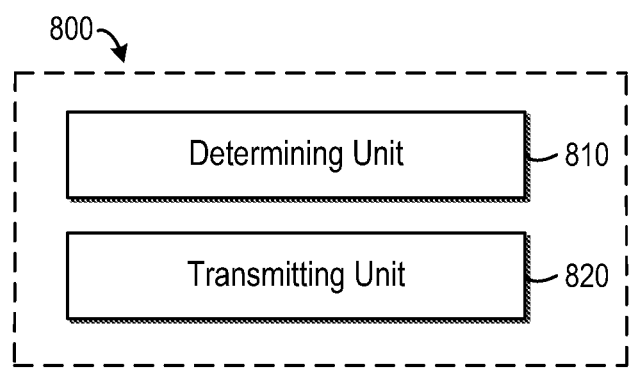
FIG. 8 illustrates a block diagram of an apparatus for radio resource controlling at the BS side in accordance with one embodiment of the subject matter described herein.

FIG. 8 illustrates a block diagram of an apparatus 800 for radio resource controlling at the BS side in accordance with one embodiment of the subject matter described herein. As shown, the apparatus 800 comprises a determining unit 810 configured to, responsive to a predetermined condition of D2D communication between a master UE and a slave UE being met, determine radio resource information of the slave UE in cellular communication. The apparatus 800 further comprises a transmitting unit 820 configured to transmit the radio resource information to the master UE.

In one embodiment, the determining unit 810 may comprise an obtaining unit configured to, responsive to receiving a message indicating that the D2D communication is to be set up, obtain the radio resource information. In one embodiment, the radio resource information may include cellular radio resource configuration information and radio capability information of the slave UE.

In one embodiment, the determining unit 810 may comprise an obtaining unit configured to, responsive to that cellular radio resource of the slave UE is configured after the D2D communication is set up, obtain the radio resource information. In one embodiment, the radio resource information may include cellular radio resource configuration information of the slave UE.

In one embodiment, the obtaining unit may be further configured to obtain the radio resource information from a base station serving the slave UE.

In one embodiment, the apparatus 800 may further comprise a receiving unit configured to receive D2D radio resource configuration information from the master UE or the slave UE, wherein the D2D radio resource configuration information is transmitted from the master or slave UE responsive to D2D radio resource being configured after the D2D communication is set up.

The units included in the apparatuses 700 and/or 800 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses 700 and/or 800 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Generally, various embodiments of the subject matter described herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the subject matter described herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the subject matter can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method implemented by master user equipment comprising:
   obtaining radio resource information associated with a slave user equipment in cellular communication, the radio resource information comprising capability information and information on an existing cellular radio resource configuration currently being used by the slave user equipment;
   performing a first device-to-device radio resource configuration for device-to-device (D2D) communication between the master user equipment and the slave user equipment based on the capability information and the existing cellular radio resource configuration; and
   determining a remaining capacity of the slave user equipment that is useable for a second device-to-device radio resource configuration for future device-to-device communications based on the existing cellular radio resource configuration and the first device-to-device radio resource configuration.

2. The method of claim 1, wherein obtaining the radio resource information comprises:

transmitting a message to a base station associated with the cellular communication, the message indicating that the D2D communication is to be set up; and
   receiving the radio resource information from the base station, wherein the radio resource information is transmitted by the base station in response to the message.

3. The method of claim 1, wherein the capability information includes at least one of:
   Multiple Input Multiple Output (MIMO) capability, a maximum number of Downlink Share Channel (DL-SCH) transport block bits received within a Transmission Time Interval (TTI), a maximum number of Uplink Share Channel (UL-SCH) transport block bits transmitted within a TTI, a total number of DL-SCH soft channel bits, and a supported band combination.

4. The method of claim 1, wherein obtaining the radio resource information comprises:
   receiving the radio resource information from a base station associated with the cellular communication or from the slave user equipment, wherein the radio resource information is transmitted by the base station or the slave user equipment in response to a cellular radio resource of the slave user equipment being configured after the D2D communication is set up.

5. The method of claim 1, further comprising:
   responsive to a D2D radio resource being configured, transmitting D2D radio resource configuration information to a base station communicating on the existing cellular radio resource configuration with the slave user equipment.

6. The method of claim 1, wherein the existing cellular radio resource configuration identifies radio resources currently used by the slave user equipment for the cellular communication.

7. The method of claim 1, wherein the existing cellular radio resource configuration identifies radio resources currently used by the slave user equipment for the cellular communication via a base station, the base station being distinct from the master user equipment.

8. A method implemented by a base station comprising:
   responsive to a predetermined condition of device-to-device (D2D) communication between a master user equipment and a slave user equipment being met, determining radio resource information of the slave user equipment in cellular communication, the radio resource information comprising capability information and information on an existing cellular radio resource configuration currently being used by the slave user equipment;
   transmitting the radio resource information to the master user equipment;
   receiving information on an existing device-to-device resource configuration currently being used by the slave user equipment from the slave user equipment; and
   ensuring that a future cellular radio resource configuration does not exceed a radio capability of the slave user equipment based on the existing device-to-device resource configuration.

9. The method of claim 8, wherein determining the radio resource information comprises:
   responsive to receiving a message indicating that the D2D communication is to be set up, obtaining the radio resource information.

10. The method of claim 9, wherein obtaining the radio resource information comprises:

obtaining the radio resource information from a base station serving the slave user equipment.

11. The method of claim 8, wherein determining the radio resource information comprises:
responsive to a cellular radio resource of the slave user equipment being configured after the D2D communication is set up, obtaining the radio resource information.

12. The method of claim 8, further comprising:
receiving D2D radio resource configuration information from the master user equipment or the slave user equipment, wherein the D2D radio resource configuration information is transmitted by the master user equipment or the slave user equipment responsive to D2D radio resource being configured after the D2D communication is set up.

13. The method of claim 8, wherein the existing cellular radio resource configuration identifies radio resources currently used by the slave user equipment for the cellular communication.

14. The method of claim 8, wherein the existing cellular radio resource configuration identifies radio resources currently used by the slave user equipment for the cellular communication via the base station, the base station being distinct from the master user equipment.

15. User equipment comprising:
a receiver configured to receive first cellular radio resource information associated with a slave user equipment in cellular communication, the first cellular radio resource information comprising capability information and information on a first cellular radio resource configuration being used by the slave user equipment; and
a controller configured to configure a radio resource configuration for device-to-device (D2D) communication with the slave user equipment based on the capability information and information on the first cellular radio resource configuration, the controller further arranged to directly update the radio resource configuration for the D2D communication with the slave user equipment using second cellular radio resource information exchanged with the slave user equipment in control plane signaling, the second cellular radio resource information comprising information on a second cellular radio resource configuration being used by the slave user equipment.

16. The user equipment of claim 15, further comprising a transmitter configured to transmit a message to a base station associated with the cellular communication, the message indicating that the D2D communication is to be set up,
wherein the receiver is configured to receive the first cellular radio resource information from the base station, the first cellular radio resource information being transmitted from the base station in response to the message.

17. The user equipment of claim 16, wherein the first cellular radio resource information includes cellular radio resource configuration information and radio capability information of the slave user equipment.

18. The user equipment of claim 15, wherein the receiver is configured to receive the first cellular radio resource information from a base station associated with the cellular communication or from the slave user equipment, wherein the first cellular radio resource information is transmitted from the base station or the slave user equipment in response to a cellular radio resource of the slave user equipment being configured after the D2D communication is set up.

19. The user equipment of claim 15, further comprising:
a transmitter configured to transmit D2D radio resource configuration information to a base station associated with the cellular communication, responsive to a D2D radio resource being configured after the D2D communication is set up.

\* \* \* \* \*